United States Patent
Kriman et al.

(10) Patent No.: US 10,514,596 B2
(45) Date of Patent: *Dec. 24, 2019

(54) INTEGRATED LIGHT PIPE FOR OPTICAL PROJECTION

(71) Applicant: APPLE INC., Cupertino, CA (US)

(72) Inventors: Moshe Kriman, Tel Aviv (IL); Adar Magen, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,102

(22) Filed: Oct. 21, 2018

(65) Prior Publication Data

US 2019/0227421 A1    Jul. 25, 2019

Related U.S. Application Data

(63) Continuation of application No. 15/907,314, filed on Feb. 28, 2018, now Pat. No. 10,146,116, which is a continuation of application No. 15/691,762, filed on Aug. 31, 2017, now Pat. No. 9,939,721, which is a continuation of application No. 14/852,563, filed on Sep. 13, 2015, now abandoned.

(51) Int. Cl.
| | |
|---|---|
| *F21V 7/00* | (2006.01) |
| *G03B 21/20* | (2006.01) |
| *G02B 27/42* | (2006.01) |
| *G02B 19/00* | (2006.01) |
| *G02B 3/00* | (2006.01) |

(52) U.S. Cl.
CPC ....... *G03B 21/2066* (2013.01); *G02B 3/0068* (2013.01); *G02B 19/0028* (2013.01); *G02B 19/0066* (2013.01); *G02B 27/425* (2013.01); *G03B 21/2033* (2013.01)

(58) Field of Classification Search
CPC .... G02B 27/425; G02B 27/4255; G03B 7/00; G03B 1/00; G03B 31/00; G03B 13/00
USPC ...................................................... 362/299
See application file for complete search history.

(56) References Cited

U.S. PATENT DOCUMENTS

| | | | | |
|---|---|---|---|---|
| 9,939,721 | B2 * | 4/2018 | Kriman | ............ G03B 21/2066 |
| 10,146,112 | B2 * | 12/2018 | Kurata | ............ G03B 21/2026 |
| 2006/0252169 | A1 * | 11/2006 | Ashida | ............ G02B 3/0031 |
| | | | | 438/29 |
| 2011/0273600 | A1 * | 11/2011 | Kriman | ............ H01L 27/14618 |
| | | | | 348/294 |

* cited by examiner

*Primary Examiner* — Ali Alavi
(74) *Attorney, Agent, or Firm* — Kligler & Associates (57) ABSTRACT

An optical device includes a first plate having a first transparent region defining an exit face of the device, and a second plate having a second transparent region defining an entrance face of the device. At least one lens is formed over at least one of the first and second transparent regions. First and second planar reflectors are spaced apart and fixed between the first and second plates in mutually-parallel orientations diagonal to the first and second plates, thereby defining an optical path through the device from the entrance face, reflecting from the first and second reflectors, through the exit face and passing through the at least one refractive surface.

11 Claims, 7 Drawing Sheets

INTEGRATED LIGHT PIPE FOR OPTICAL PROJECTION

CROSS-REFERENCE TO RELATED APPLICATION

This application is a continuation of U.S. patent application Ser. No. 15/907,314, filed Feb. 28, 2018, which is a continuation of U.S. patent application Ser. No. 15/691,762, filed Aug. 31, 2017 (now U.S. Pat. No. 9,939,721), which is a continuation of U.S. patent application Ser. No. 14/852,563, filed Sep. 13, 2015 (now abandoned).

FIELD OF THE INVENTION

The present invention relates generally to optical devices and methods for their manufacture, and particularly to miniaturized integrated optical devices.

BACKGROUND

Miniature optical projectors are used in a variety of applications. For example, such projectors may be used to cast a pattern of coded or structured light onto an object for purposes of 3D mapping (also known as depth mapping). In this regard, U.S. Patent Application Publication 2008/0240502 describes an illumination assembly in which a light source, such as a laser diode or LED, transilluminates a transparency with optical radiation so as to project a pattern onto the object. (The terms "optical" and "light" as used herein refer generally to any of visible, infrared, and ultraviolet radiation.) An image capture assembly captures an image of the pattern that is projected onto the object, and a processor processes the image so as to reconstruct a three-dimensional (3D) map of the object.

PCT International Publication WO 2008/120217 describes further aspects of the sorts of illumination assemblies that are shown in the above-mentioned US 2008/0240502. In one embodiment, the transparency comprises an array of micro-lenses arranged in a non-uniform pattern. The micro-lenses generate a corresponding pattern of focal spots, which is projected onto the object.

Optical projectors may, in some applications, project light through one or more diffractive optical elements (DOEs). For example, U.S. Patent Application Publication 2009/0185274 describes apparatus for projecting a pattern that includes two DOEs that are together configured to diffract an input beam so as to at least partially cover a surface. The combination of DOEs reduces the energy in the zero-order (undiffracted) beam. In one embodiment, the first DOE generates a pattern of multiple beams, and the second DOE serves as a pattern generator to form a diffraction pattern on each of the beams.

As another example, U.S. Pat. No. 9,091,413 describes photonics modules that include optoelectronic components and optical elements (refractive and/or patterned) in a single integrated package. According to the inventors, these modules can be produced in large quantities at low cost, while offering good optical quality and high reliability. They are useful as projectors of patterned light, for example in 3D mapping applications as described above, but they may also be used in various other applications that use optical projection and sensing, including free-space optical communications.

SUMMARY

Embodiments of the present invention that are described hereinbelow provide integrated optical devices with enhanced reliability and manufacturability.

There is therefore provided, in accordance with an embodiment of the present invention, an optical device, which includes a first plate having a first transparent region defining an exit face of the device and a second plate having a second transparent region defining an entrance face of the device. At least one lens is formed over at least one of the first and second transparent regions. First and second planar reflectors are spaced apart and fixed between the first and second plates in mutually-parallel orientations diagonal to the first and second plates, thereby defining an optical path through the device from the entrance face, reflecting from the first and second reflectors, through the exit face and passing through the at least one refractive surface.

In a disclosed embodiment, the at least one lens includes at least a first lens formed over the first transparent region and at least a second lens formed over the second transparent region. Additionally or alternatively, the at least one lens includes at least first and second lenses formed on opposing sides of at least one of the first and second plates. Further additionally or alternatively, the first and second plates and the first and second planar reflectors define a cavity that contains the optical path, and the device includes third and fourth plates, which are fixed to the first and second plates and the first and second planar reflectors on opposing sides of the device in an orientation perpendicular to the first and second plates and the planar reflectors so as to enclose the cavity.

In one embodiment, the device includes a patterning element and a first spacer, fixed between the patterning element and the first plate so as to hold the patterning element in proximity to the exit face, as well as a light source mounted on a substrate and a second spacer, fixed between the substrate and the second plate so as to hold the light source in proximity to the entrance face, so that light emitted from the light source passes through the device along the optical path and transilluminates the patterning element, thereby generating patterned light.

There is also provided, in accordance with an embodiment of the present invention, a method for producing an optical device. The method includes fixing together first and second planar reflectors in mutually-parallel orientations with a predefined spacing between the first and second planar reflectors. First and second plates are provided, having respective first and second transparent regions that respectively define exit and entrance faces of the device, with at least one lens formed over at least one of the first and second transparent regions. The first and second plates are fixed to the fixed-together planar reflectors in an orientation diagonal to the planar reflectors, so as to define an optical path through the device from the entrance face, reflecting from the first and second reflectors, through the exit face and passing through the at least one refractive surface.

In some embodiments, providing the first and second plates includes forming an array of lenses on a transparent substrate, and dicing the transparent substrate to produce at least one of the first and second plates with the at least one lens formed thereon. Typically, the array of lenses is formed by molding or replication on the transparent substrate. Additionally or alternatively, fixing together the first and second planar reflectors includes fixing together multiple pairs of the planar reflectors so as to define multiple optical devices having respective optical cavities, wherein fixing the first and second plates includes attaching the transparent plate to the multiple pairs of the planar reflectors so that the lenses in the array are respectively aligned with the optical cavities before dicing the transparent substrate.

In a disclosed embodiment, the method includes, before fixing together the first and second planar reflectors, polishing and applying a reflective coating to respective inner surfaces of the planar reflectors from which the optical path is to reflect within the device.

In some embodiments, the first and second plates and the first and second planar reflectors define a cavity that contains the optical path, and the method includes fixing third and fourth plates to the first and second plates and the first and second planar reflectors on opposing sides of the device in an orientation perpendicular to the first and second plates and the planar reflectors so as to enclose the cavity.

In a disclosed embodiment, fixing together the first and second planar reflectors includes bonding a pair of reflective sheets to opposing sides of spacers having a thickness equal to the predefined spacing, dicing the bonded reflective sheets and spacers along a first direction perpendicular to the spacers to produce a set of strips, arranging the set of strips side-by-side, bonding the third and fourth plates to opposing sides of the arranged set of the strips, dicing the set of the strips and the third and fourth plates that are bonded thereto along a second direction diagonal to the strips so as to produce multiple rows of diagonal cavities, and dicing apart the cavities in each of the multiple rows to produce the fixed-together planar reflectors. Typically, fixing the first and second plates to the fixed-together planar reflectors includes, before dicing apart the cavities, arranging the multiple rows of the diagonal cavities side by side, and bonding the first and second plates to opposing sides of the arranged multiple rows, with an array of lenses on at least one of the first and second plates aligned with the cavities, wherein dicing apart the cavities includes dicing apart the first and second plates and the aligned lenses together with the cavities to which they are fixed.

In some embodiments, the method includes fixing a patterning element in proximity to the exit face, and fixing a light source in proximity to the entrance face, so that light emitted from the light source passes through the device along the optical path and transilluminates the patterning element, thereby generating patterned light. Typically, fixing the patterning element includes fixing a first spacer between the first plate and the patterning element, and fixing the light source includes fixing a second spacer between the second plate and a substrate on which the light source is mounted.

The present invention will be more fully understood from the following detailed description of the embodiments thereof, taken together with the drawings in which:

DETAILED DESCRIPTION OF EMBODIMENTS

Overview

Mass production of miniaturized optical devices calls for product designs that meet the often-conflicting objectives of high precision and reliability and low manufacturing cost. Such designs typically require tight, well-controlled assembly tolerances, structural strength, and manufacturability with high yield, all within strict size and cost constraints.

Embodiments of the present invention that are described hereinbelow address these demands in the context of a device having a folded optical design. The design is "folded" in the sense that the optical path through the device reflects from two internal reflectors in the course of passing from the entrance face to the exit face. This sort of design can be useful, inter alia, in extending the optical length of the device while maintaining a low overall dimensional profile. The extended length can be advantageous, for example, in telescopic and microscopic optical designs, in which lenses are positioned at or near one or both of the entrance and exit faces.

In the disclosed embodiments, an optical device comprises a pair of plates having transparent regions defining the entrance and exit faces of the device. (The plates, which are referred to herein as the entrance and exit plates, may be entirely transparent, so that the "transparent regions" encompass the entire areas of the plates.) To define the folded optical path, a pair of planar reflectors are fixed between the pair of plates, in mutually-parallel orientations diagonal to the entrance and exit plates and spaced apart by a predefined distance. At least one lens is formed over one or both of the transparent regions. For greater optical power, lenses are formed over both transparent regions and may, alternatively or additionally, be formed on both sides of one or both of the plates in at least one of the transparent regions.

The entrance and exit plates and the two planar reflectors define a cavity between them, typically with a parallelogram profile, which contains the optical path. In the embodiments described below, additional side plates are fixed to the entrance and exit plates and to the planar reflectors on opposing sides of the device in an orientation perpendicular to the entrance and exit plates and the planar reflectors so as to enclose the cavity. These side plates may be bonded to the other optical components so as to seal the cavity, or they may contain vent holes. This sort of device is referred to herein as an integrated light pipe.

In a disclosed embodiment, the light pipe is integrated into a miniature optical projector. In this embodiment, a patterning element, such as a diffractive optical element (DOE) or other transparency, is held in proximity to the exit face of the light pipe by a first spacer, fixed between the patterning element and the exit plate. A light source, mounted on a substrate, is held in proximity to the entrance face by a second spacer, fixed between the substrate and the entrance plate. Thus, light emitted from the light source passes through the light pipe along the optical path and transilluminates the patterning element, thereby generating patterned light. The patterned light may be used, for example, in 3D mapping systems, as described in the Background section, as well as in other applications of optical projection that are known in the art.

Although the disclosed embodiments relate specifically to projection systems of this sort, light pipes in accordance with the principles of the present invention may alternatively be used in other sorts of integrated optical designs for both projection and imaging applications. The methods of manufacture that are described hereinbelow may likewise be adapted for use in the production of other sorts of integrated optical devices, particularly devices containing folded optical paths.

Light Pipe Design

Figure 1A:
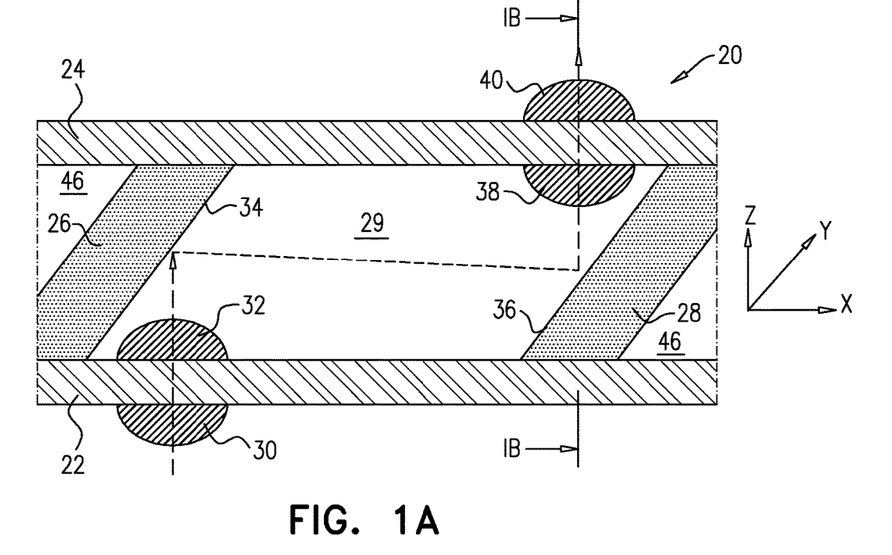
FIGS. 1A and 1B are schematic sectional views of an integrated light pipe, in accordance with an embodiment of the invention.
Figure 1B:
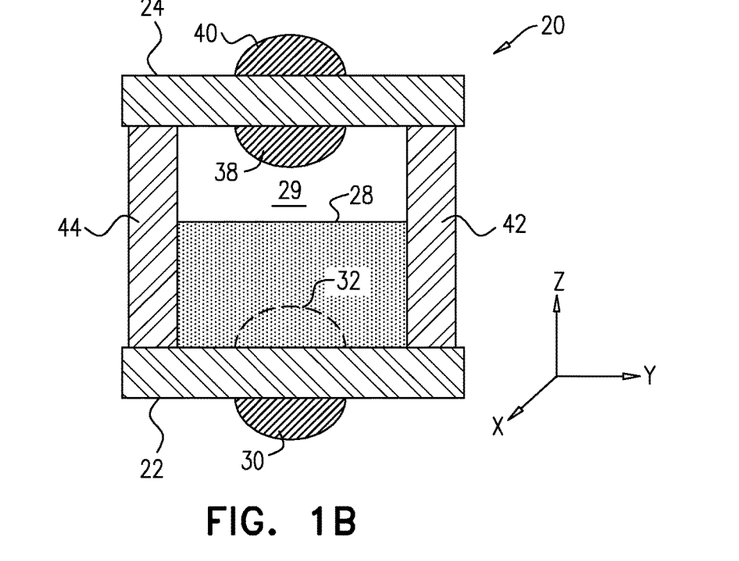

FIGS. 1A and 1B are schematic sectional views of an optical device configured as an integrated light pipe 20, in accordance with an embodiment of the invention. The views in the two figures are rotated by 90° relative to one another, as indicated by the Cartesian axes in the figures, with the section in FIG. 1B taken along the line marked IB-IB in FIG. 1A. The optical path through light pipe 20 is shown as a dashed line through the light pipe, extending from an entrance face in an entrance plate 22 to an exit face in an exit plate 24. For the sake of convenience, the Z-axis is taken to be along the direction of the optical axis at the entrance and exit faces, and this direction is referred to alternatively as the vertical direction (although light pipe 20 can typically operate in any orientation).

Plates 22 and 24 typically comprise a transparent substrate, such as a glass plate or wafer, oriented in the X-Y plane in the present example. A pair of planar reflectors 26 and 28, mutually parallel and spaced apart by a precisely-defined distance, are fixed diagonally between plates 22 and 24. Reflectors 26 and 28 may comprise any suitable material, such as glass, ceramic or silicon, with surface coatings 34 and 36 of a type suitable to give high reflectance in the wavelength range in which pipe 20 is to operate (for example, gold or dielectric coatings). The angles of plates 26 and 28 are tightly controlled by the manufacturing process of light pipe 20, as described further hereinbelow. Plates 22 and 24 and reflectors 26 and 28 thus define an internal cavity 29 of light pipe 20 having a parallelogram shape.

Lenses 30, 32, 38 and 40 are formed on opposing sides of plates 22 and 24, respectively, at the entrance and exit faces of light pipe 20. Alternatively, a smaller number of lenses may be formed, depending on application requirements. Typically, lenses 30, 32, 38 and 40 are formed as arrays of lens elements by molding or replication on transparent substrates that are then diced to produce plates 22 and 24, as illustrated hereinbelow. Although lenses 30, 32, 38 and 40 are shown in the figures as refractive elements, the lenses may, alternatively or additionally, comprise diffractive elements. Further additionally or alternatively, the lenses may have anti-reflective and/or other thin-film coatings, and some or all of the lenses may have surrounding apertures, as are known in the art. As further options, one or more of the lenses may have an associated diffuser or may be configured as an array of two or more lenses (for example, when light pipe 20 is to receive light from two or more light sources).

As shown in FIG. 1B, the sides of light pipe 20 are closed by plates 42 and 44, which are oriented in the X-Z plane in the illustrated embodiment, perpendicular to plates 22, 24 and to reflectors 26, 28. Plates 42 and 44, which may likewise comprise glass or silicon, are fixed to plates 22 and 24 and to reflectors 26 and 28 on opposing sides of light pipe 20, so as to enclose cavity 29 within the light pipe. Depending on application requirements, the cavity may be hermetically sealed, or may have air vents (not shown).

As a result of the manufacturing process that is described below, triangular voids 46 may remain at the corners of light pipe 20, as shown in FIG. 1A. For enhanced mechanical integrity and ease of mounting, it may be advantageous either to fill voids 46, for example with an epoxy or polymer filling, or to dice plates 22 and 24 in such a way as to remove the overhanging parts above these voids. Alternatively, reflectors 26 and 28 may be made from thicker substrates, so that voids 46 do not remain after dicing.

Manufacturing Process

The figures that follow show successive steps in a process of manufacturing that can be used to produce integrated light pipe 20, in accordance with an embodiment of the invention. Alternatively, this process may be adapted to produce other types of integrated optical devices.

Figure 2A:
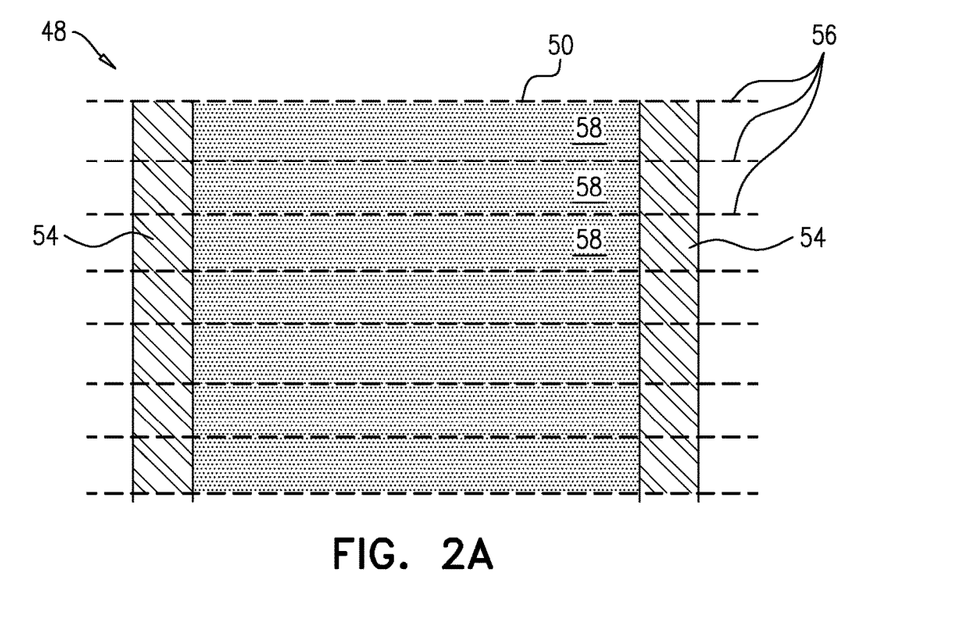
FIG. 2A is a schematic top view of a reflector assembly used in producing an integrated light pipe, in accordance with an embodiment of the invention.
Figure 2B:
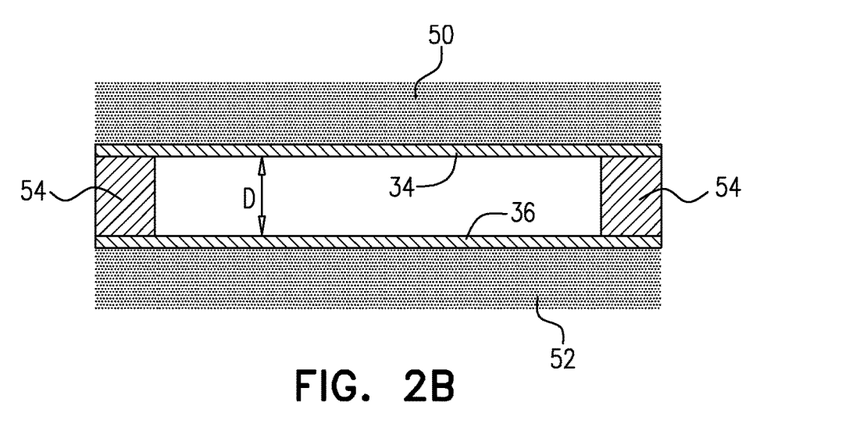
FIG. 2B is a schematic side view of a reflector strip cut from the assembly of FIG. 2A, in accordance with an embodiment of the invention.

FIGS. 2A and 2B schematically illustrate a reflector assembly 48 that is used in a first stage of this process, in accordance with an embodiment of the invention. FIG. 2A is a top view of reflector assembly 48, while FIG. 2B is a side view of a reflector strip 58 that is cut from assembly 48.

Assembly 48 comprises an upper reflective sheet 50 and a lower reflective sheet 52, separated by spacers 54. Sheets 50 and 52 will ultimately be diced to define reflectors 26 and 28, with cavity 29 between them, as described hereinbelow. Therefore, before producing assembly 48, sheets 50 and 52 are ground and polished to the desired thickness and surface quality. The polished surfaces, which are to become the inner surfaces of planar reflectors 26 and 28, facing into cavity 29, are then coated with reflective surface coatings 34 and 36. These coatings may be applied using any suitable process that is known in the art, such as sputtering (for metal coatings) or vacuum evaporation (for dielectrics).

Spacers 54 are fixed between the edges of sheets 50 and 52 to hold the substrates apart by a precise distance, marked "D" in FIG. 2B. This distance is dictated by the desired optical properties of light pipe 20. Spacers 54 may comprise the same material (such as glass, ceramic or silicon) as sheets 50 and 52, or a different material. For example, spacers 54 may be made from an additional sheet of material, possibly from the same material as sheets 50 and 52, which is diced to produce multiple spacers of the desired width. To ensure that the distance between sheets 50 and 52 is accurately maintained, spacers 54 (or the sheet from which they are cut) are typically ground and polished on both sides to a thickness equal to the specified distance D. Spacers 54 are then bonded between sheets 50 and 52, for example using a suitable adhesive, with uniform pressure applied along the edges of the substrates during bonding to maintain uniform spacing.

After bonding of sheets 50 and 52 to spacers 54, assembly 48 is diced along lines 56 to produce multiple reflector strips 58. The width of strips 58 is equal to the width of reflectors 26 and 28 within light pipe 20 in the Y-direction, as shown in FIG. 1B.

Figure 3:
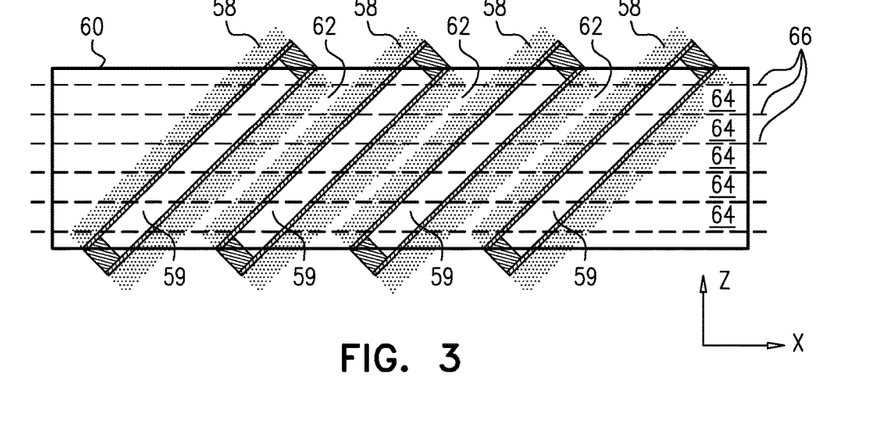
FIG. 3 is a schematic top view of a stack of reflector strips, in accordance with an embodiment of the invention.
Figure 5A:
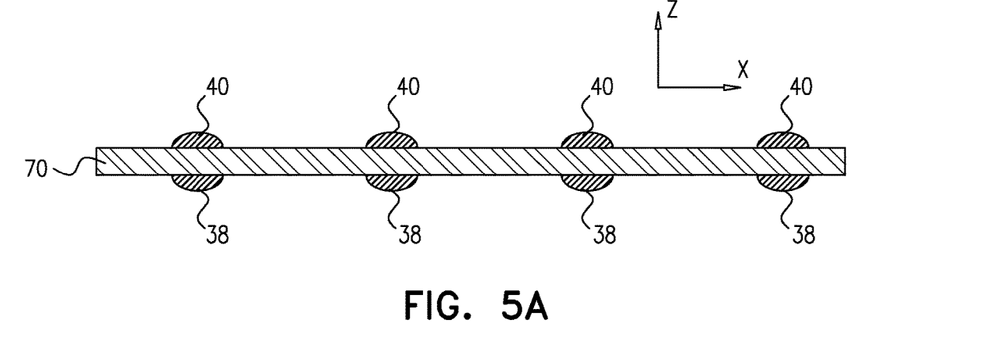
FIGS. 5A and 5B are schematic side and top views, respectively, of an array of lenses, in accordance with an embodiment of the invention.

FIG. 3 is a schematic top view of a stack of reflector strips 58, in accordance with an embodiment of the invention. Strips 58 are arranged side by side, with the cavities between reflective surface coatings 34 and 36 parallel to one another and with predefined spaces 62 between adjacent strips 58. Spaces 62 are chosen to match the pitch of the arrays of lenses that will be used in a subsequent stage of the process (as shown in FIGS. 5A/B and 6A/B).

Strips 58 may be placed and held in this manner in a suitable jig or on an adhesive tape in the desired spacing and orientation. Spaces 62 may optionally be filled with a solid material, such as a polymer filler. For high yield, it is advantageous that the angle between the line running through the ends of strips 58 and the axes of central cavities 59 of the strips be equal to the diagonal angle of cavity 29 within light pipes 20.

After arranging strips 58 in the manner shown in FIG. 3, sheets 60 are bonded to the opposing sides of the array of strips 58. Sheets 60 typically comprise, like sheets 50 and 52, a suitable glass, ceramic, or semiconductor material, which will ultimately be diced into plates 42 and 44, forming the side walls of light pipes 20. The entire assembly of FIG. 3 is then diced along lines 66 that are diagonal to strips 58 in order to produce multiple rows 64 of diagonal cavities. The angle between lines 66 and the internal surfaces of cavities 59 is equal to the diagonal angle of cavities 29, relative to the X-axis, in light pipes 20. In other words, rows 64 are sliced apart along a direction which is to be the X-Y plane in light pipes 20, with a distance between lines 66 that is equal to the height of reflectors 26, 28 and plates 42, 44 in the Z-direction (FIG. 1B). Spacers 54 are sliced off at this stage and discarded. The cavities remaining in each of rows 64 will subsequently be diced apart to produce fixed-together planar reflectors 26 and 28 (as shown in FIGS. 6A/B).

Figure 4:
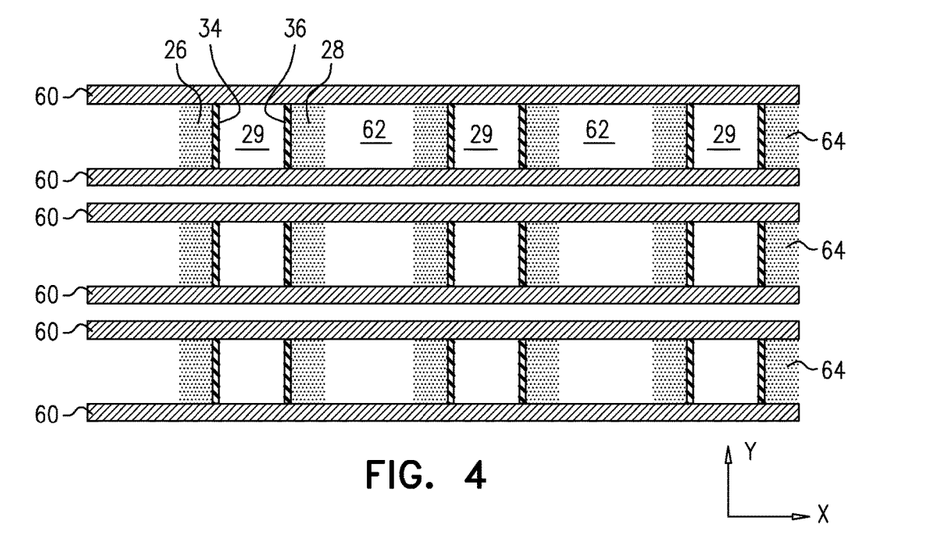
FIG. 4 is a schematic top view of an array of light pipe strips, which are cut from the stack of reflector strips shown in FIG. 3, in accordance with an embodiment of the invention.

FIG. 4 is a schematic top view of an array of rows 64 of light pipe strips, which are cut from the stack of reflector strips 58 shown in FIG. 3, in accordance with an embodiment of the invention. Rows 64 are rotated by 90° after slicing, so that the diagonal cavities between the pairs of planar reflectors 26 and 28 are parallel and open outward, relative to the plane of the figure. After rotation, rows 64 are arranged side by side and aligned with one another so that the openings of cavities 29 are located on a grid, with distances between the cavities equal to the pitch of the lens array. Again, a suitable jig or tape may be used to hold rows 64 in the appropriate orientation with the correct spacing.

Figure 5B:
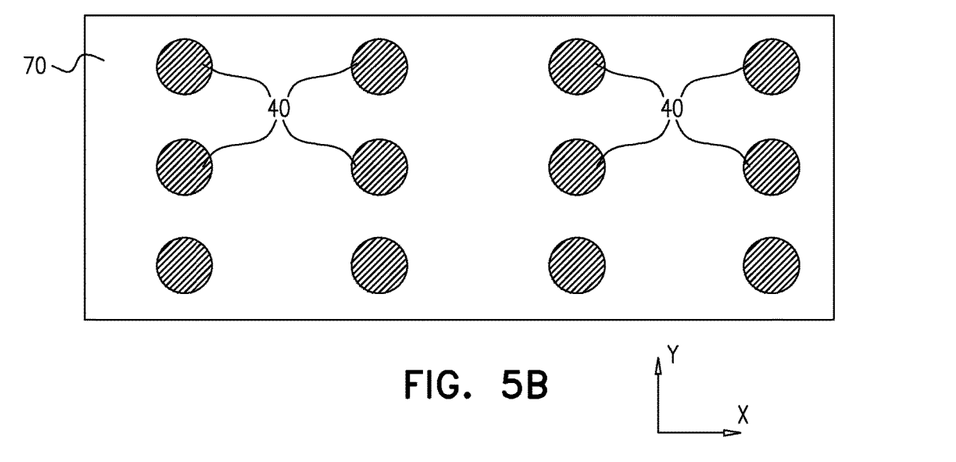

FIGS. 5A and 5B are schematic side and top views, respectively, of an array of lenses 38, 40, which are formed on opposing sides of a sheet 70, in accordance with an embodiment of the invention. Sheet 70 will subsequently be diced, together with rows 64, to produce exit plate 24 of light pipes 20, while a similar sheet 72 (FIG. 6A) is provided and diced to produce entrance plate 22 of the light pipes. Typically, sheets 70 and 72 comprise glass, but any other suitable material may be used, as long as it has at least a transparent region in the area of the lenses. Lenses 38 and 40 may, for example, comprise polymer elements replicated on sheet 70, or they may be integrally molded with sheet 70. The pitch of the array of lenses 38, 40 is designed to match the pitch of the cavities in rows 64 as shown in FIG. 4.

Figure 6A:
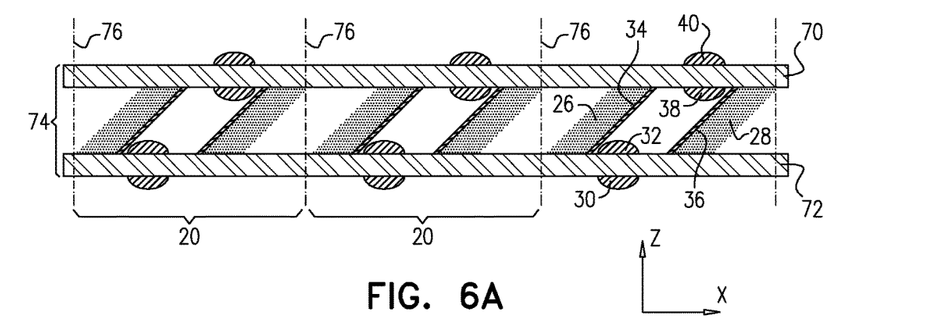
FIGS. 6A and 6B are schematic side and top views, respectively, of an array of integrated telescopes, in accordance with an embodiment of the invention.
Figure 6B:
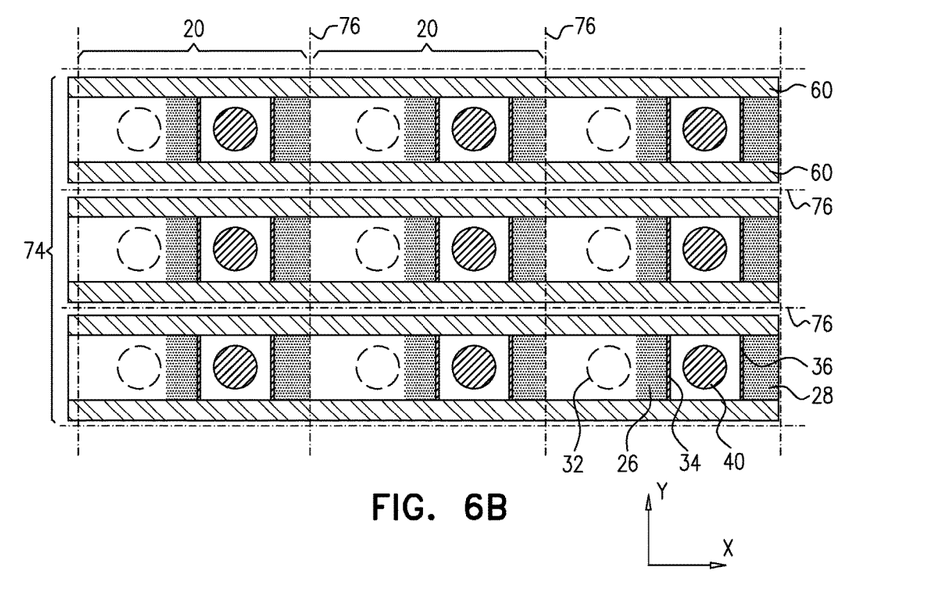

FIGS. 6A and 6B are schematic side and top views, respectively, of an array 74 of integrated light pipes 20, in accordance with an embodiment of the invention. To form array 74, sheet 70 is positioned so that lenses 38 and 40 are aligned with the upper openings of cavities 29 of what are to become light pipes 20, and sheet 70 is then bonded in position. Similarly, sheet 72 is positioned and bonded so that lenses 30 and 32 are aligned with the lower openings of cavities 29. The entire array 74, including sheets 70 and 72 and rows 64, is then diced apart along lines 76 in order to singulate light pipes 20, including lenses 30, 32, and 40 and cavity 29 therebetween. Optionally, the elements of array 74 may be optically tested before singulation.

When other optical and/or optoelectronic elements are to be integrated with light pipes 20, some or all of the integration steps may likewise take place before singulation. For example, in a patterned light projector, an array of patterning elements may likewise be produced and bonded to array 74 before singulation.

Figure 7:
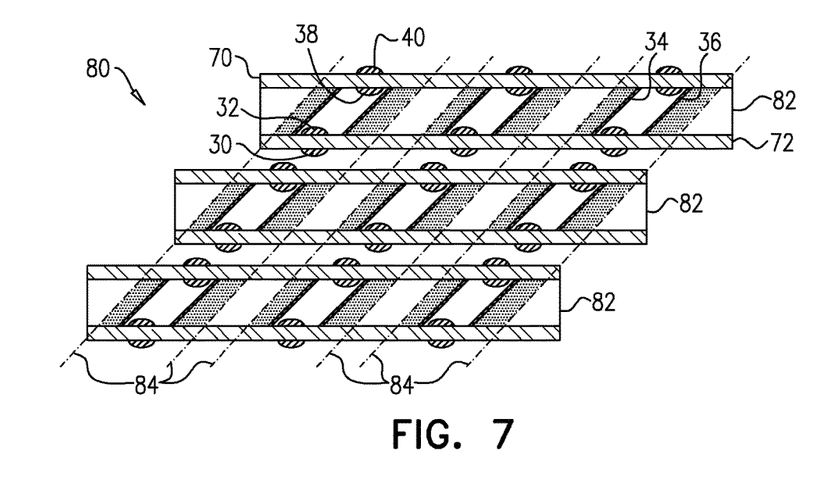
FIG. 7 is a schematic side view of an array of integrated telescopes, in accordance with another embodiment of the invention.

FIG. 7 is a schematic side view of an array 80 of integrated light pipes 20, in accordance with another embodiment of the invention. Array 80 comprises multiple rows 82 of light pipes 20, which can be produced by dicing array 74 along lines 76 running in the X-direction, as shown in FIG. 6B, but not in the Y-direction. Rows 82 are then turned on their sides and stacked with a diagonal offset, as shown in FIG. 7. As in previous embodiments, a suitable jig or tape may be used to hold rows 82 in the desired positions. Array 80 is diced along diagonal lines 84 so as to produce singulated light pipes 20 without voids 46 at their corners.

Device Integration

Figure 8:
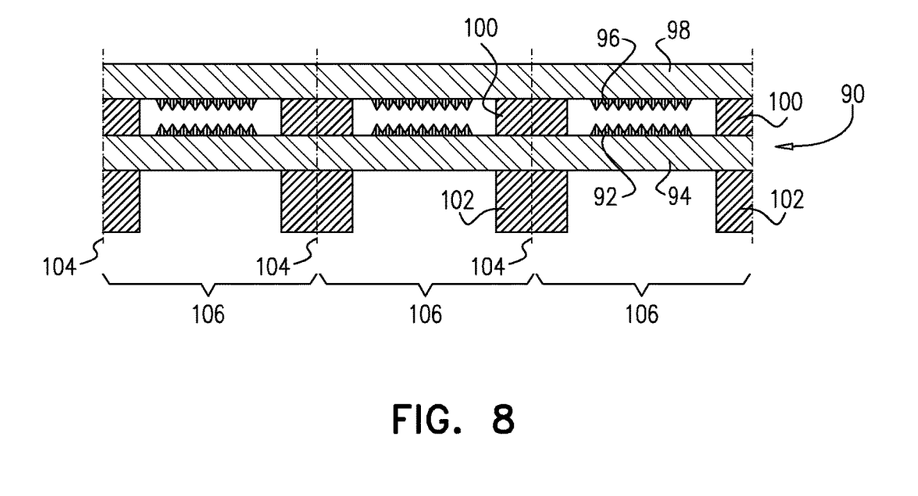
FIG. 8 is a schematic side view of an array of diffractive stacks, in accordance with an embodiment of the invention.

FIG. 8 is a schematic side view of an array 90 of diffractive stacks 106, in accordance with an embodiment of the invention. To produce stacks 106, arrays of diffractive optical elements (DOEs) 92 and 96 are formed on transparent substrates 94 and 98. The DOEs may be formed, for example, by replication of polymer structures on glass substrates, or by etching the glass substrates or, alternatively, precision molding of polymer substrates. Although the present embodiment relates specifically to production of such diffractive stacks, other sorts of transparencies may alternatively be produced and integrated with light pipes 20, mutatis mutandis.

Substrates 94 and 98 are mounted on opposing sides of a spacer layer 100. If sealing of DOEs 92 and 96 is desired, spacer layer 100 may comprise an array of openings through a solid layer; after aligning the openings with the DOEs, layer 100 is bonded between substrates 94 and 98, for example with a suitable adhesive. An additional spacer layer 102 is bonded to the underside of substrate 98. The resulting assembly is then diced along lines 104 to singulate stacks 106. Each such stack is then aligned with and mounted over lens 40 on the upper side of a respective light pipe 20, either before or after singulation of the light pipes.

Figure 9:
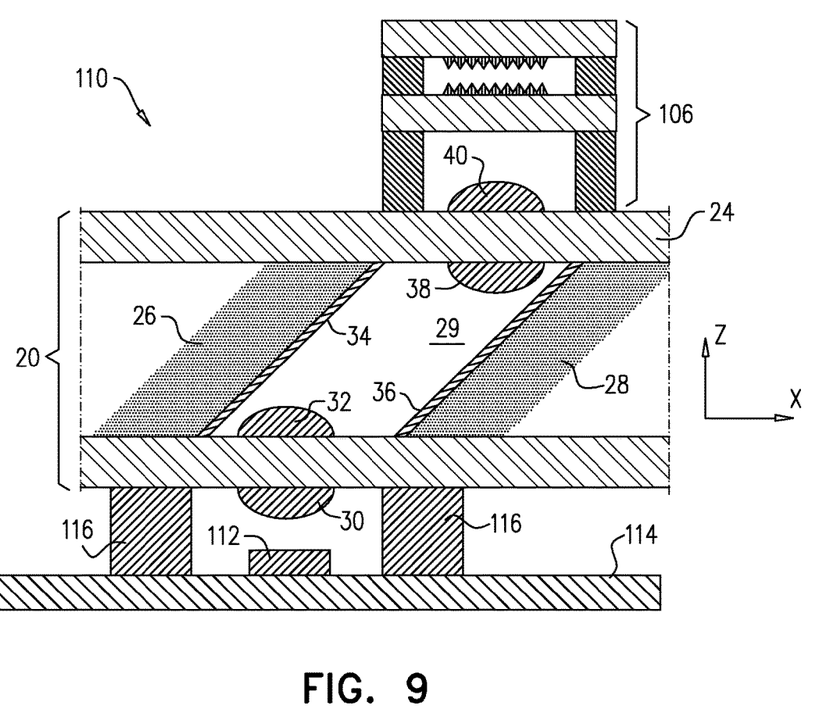
FIG. 9 is a schematic side view of an integrated optical projector, in accordance with an embodiment of the invention.

FIG. 9 is a schematic side view of an integrated optical projector 110, in accordance with an embodiment of the invention. In this embodiment, diffractive stack 106 is mounted over plate 24 on spacers made from layer 102. On the lower side of projector 110, a light source 112, such as a laser diode or LED, is mounted on a substrate 114, which is connected to plate 22 by spacers 116. Thus, light emitted from light source 112 passes along the optical path through cavity 29, reflecting from reflectors 26 and 28, and transilluminates diffractive stack 106. Integrated light pipe 20 in this embodiment serves as a beam expanding telescope for light source 112, while diffractive stack 106 serves as a patterning element, projecting patterned light onto a target.

Although FIG. 9 shows one particular application of integrated light pipe 20, the principles of the present invention may alternatively be applied in other sorts of integrated optical devices, all of which are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
   at least one diffractive optical element (DOE);
   a first plate having a first transparent region defining an exit face;
   a second plate having a second transparent region defining an entrance face;
   and
   first and second reflectors, spaced apart and fixed between the first and second plates in mutually-parallel orientations diagonal to the first and second plates,
   thereby defining an optical path through the device from the entrance face, reflecting from the first and second reflectors, through the exit face and passing through the at least one DOE.

2. The device according to claim 1, and comprising at least one lens formed over at least one of the first transparent region and the second transparent region.

3. The device according to claim 2, wherein the at least one lens comprises at least first and second lenses formed on opposing sides of at least one of the first and second plates.

4. The device according to claim 1, wherein the first and second plates and the first and second reflectors define a cavity that contains the optical path, and
   wherein the device comprises third and fourth plates, which are fixed to the first and second plates and the first and second planar reflectors on opposing sides of the device in an orientation perpendicular to the first and second plates and the planar reflectors so as to enclose the cavity.

5. The device according to claim 1, and comprising
   a spacer, fixed between the at least one DOE and the first plate so as to hold the at least one DOE in proximity to the exit face.

6. The device according to claim 1, and comprising a light source fixed in proximity to the entrance face so that light emitted by the light source propagates along the optical path and transilluminates the at least one DOE.

7. The device according to claim 6, wherein the light source is mounted on a substrate, and the device includes a spacer, fixed between the substrate and the second plate so as to hold the light source in proximity to the entrance face.

8. The device according to claim 1, wherein the at least one DOE comprises first and second DOEs, which are spaced apart long the optical path in proximity to the exit face.

9. The device according to claim 8, and comprising a spacer layer having an opening therethrough, wherein the first and second DOEs are formed on respective surfaces of first and second transparent substrates, and the first and second substrates are mounted on respective, opposing sides of the spacer layer with the first and second DOEs aligned with the opening.

10. The device according to claim 9, wherein the first and second transparent substrates are bonded to the spacer layer such that the first and second DOEs are contained within the opening.

11. The device according to claim 2, wherein the at least one lens comprises at least a first lens formed over the entrance face and at least a second lens formed over the exit face.

* * * * *